BEST AVAILABLE COPY
X8894
L. Stis,
No Printed Specification Available
(1)
Washing Machine.
Patented June 15, 1835.
CROSS REFERENCE
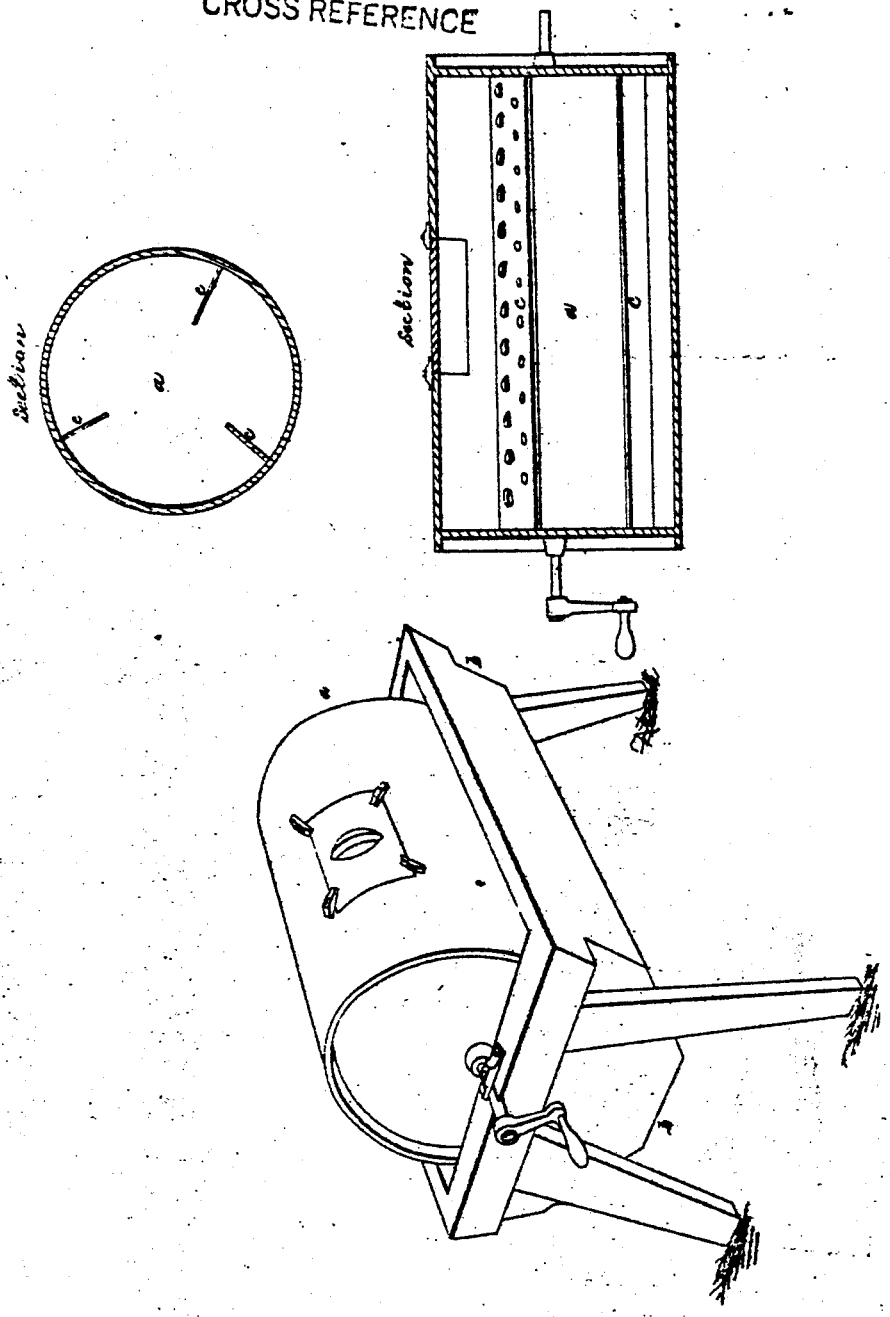

United States Patent Office

PTO - BOYERS, PA Duty Station

MISSING PAGE TEMPORARY NOTICE

PATENT # X8894 FOR ISSUE DATE 6-15-35

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text

Data Conversion Operation

Boyers, Pa